United States Patent [19]

Kaneko

[11] Patent Number: 5,237,418
[45] Date of Patent: Aug. 17, 1993

[54] AUDIO OUTPUT CIRCUIT IN ELECTRONIC APPARATUS WITH COMPOSITE DISPLAY FUNCTION

[75] Inventor: Tomoyuki Kaneko, Ibaragi, Japan

[73] Assignee: Sony Corporation, Tokyo, Japan

[21] Appl. No.: 754,544

[22] Filed: Sep. 4, 1991

[30] Foreign Application Priority Data

Sep. 4, 1990 [JP] Japan .................................. 2-234225

[51] Int. Cl.⁵ .............................................. H04N 5/262
[52] U.S. Cl. ...................................... 358/183; 358/198
[58] Field of Search .................. 358/181, 185, 198, 84, 358/93, 230, 242, 22

[56] References Cited

U.S. PATENT DOCUMENTS

| | | | |
|---|---|---|---|
| 2,832,821 | 4/1958 | DuMont | 358/242 X |
| 3,303,279 | 2/1967 | Tinklepaugh | 358/84 X |
| 3,875,674 | 7/1974 | Justice | 358/183 X |
| 5,099,365 | 3/1992 | Kang | 360/61 |

FOREIGN PATENT DOCUMENTS

0030818 3/1978 Japan ................................ 358/183

Primary Examiner—Victor R. Kostak
Attorney, Agent, or Firm—Lewis H. Eslinger; Jay H. Maioli

[57] ABSTRACT

An audio output circuit in an electronic apparatus equipped with a composite display function where a plurality of pictures can be displayed on composite screen regions of a single display screen. The circuit includes an audio signal switching circuit for selectively switching audio signals relative to the pictures displayed on the individual screen regions and outputting the selected audio signal to a speaker. The circuit also includes a simultaneous audio output switching circuit for selecting a plurality of audio signals out of those relative to the pictures displayed on the individual screen regions and then outputting the selected audio signals simultaneously through a plurality of speakers. Thus any audio signal(s) relative to the picture(s) displayed on the individual screen region(s) can be heard either selectively or simultaneously through the speaker(s).

1 Claim, 6 Drawing Sheets

AUDIO OUTPUT CIRCUIT IN ELECTRONIC APPARATUS WITH COMPOSITE DISPLAY FUNCTION

BACKGROUND OF THE INVENTION

1. Field of the Invention

The present invention relates to an audio output circuit in an electronic apparatus equipped with a composite display function. And more particularly, it relates to a novel audio output circuit so contrived that, when audio signals are outputted in an electronic apparatus having a composite display function, any audio signal relative to a desired one of pictures displayed on screen regions can be selectively heard through a speaker, or a plurality of audio signals relative to individual pictures can be heard simultaneously through individual speakers.

2. Description of the Prior Art

In digital television receivers and so forth, there is known a type having a picture-in-picture function with a parent screen region and a child screen region provided on a single monitor display screen, wherein different pictures can be displayed individually on such separate screen regions.

Figure 8:
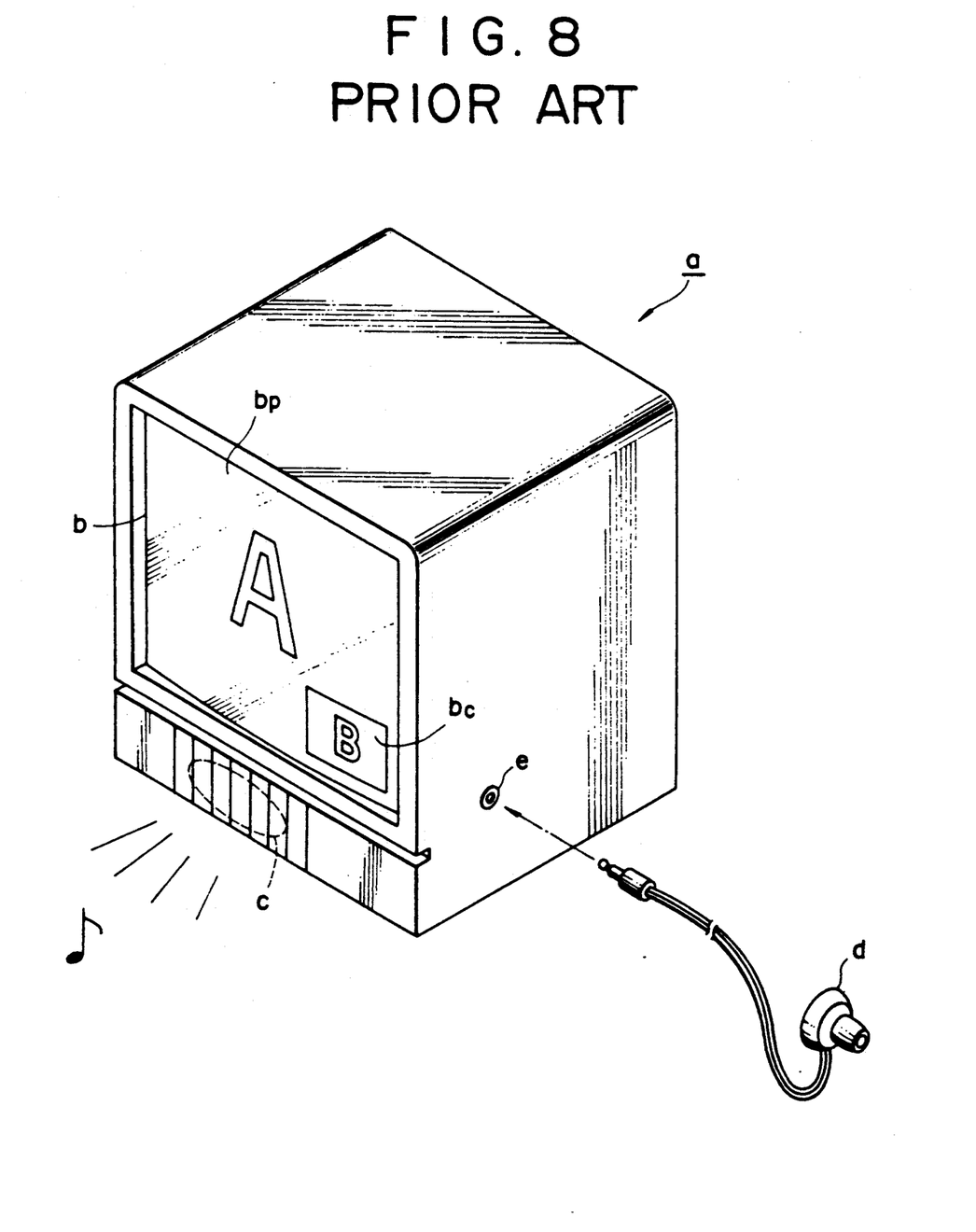
FIG. 8 is a schematic perspective view of a conventional television receiver equipped with a composite display function.

In a television receiver a shown in FIG. 8, for example, its entire display screen b is divided into a parent screen $b_p$ of a major area and a child screen $b_c$ of a minor area defined at the lower left corner, and a picture of another broadcast program or the like different from a picture of the program on the parent screen $b_p$ can be displayed on the child screen $b_c$ so that both pictures are watchable simultaneously.

In the conventional television receiver known heretofore, there exists a problem that an audio signal relative to the picture on the child screen can be heard only through an earphone (or headphones).

In this example, the output from the speaker c in the television receiver a is only the sound relative to the picture on the parent screen $b_p$, so that when it is desired to hear the sound relative to the picture on the child screen $b_c$, a plug of an earphone d needs to be connected each time to an earphone jack in the television receiver to consequently require an additional effort on the part of the user.

Meanwhile, for hearing the sound relative to the picture on the child screen $b_c$ through the speaker c without using any earphone or the like, it is necessary to display the relevant picture on the parent screen $b_p$ to eventually necessitate swapping of the pictures between the parent screen $b_p$ and the child screen $b_c$, hence lowering the degree of freedom in selection of the video signal and the audio signal.

OBJECT AND SUMMARY OF THE INVENTION

It is an object of the present invention to provide an improved audio output circuit for use in an electronic apparatus equipped with a composite display function where a plurality of pictures can be displayed on composite screen regions of a single display screen. And the feature of such audio output circuit resides in enabling a user to hear any of the sounds relative to desired pictures on the individual screen regions either selectively or simultaneously through speakers installed in the apparatus without the necessity of connecting an earphone or the like.

According to one aspect of the present invention, there is provided an audio output circuit having an audio signal switching means which switches audio signals relative to pictures being displayed on the individual screens, thereby selecting one of the audio signals and outputting the same to a speaker.

According to another aspect of the present invention, there is provided an audio output circuit having a simultaneous audio output means which is capable of selecting a plurality of audio signals out of those relative to pictures being displayed on the individual screens and then outputting the selected audio signals simultaneously to a plurality of speakers.

Therefore, in the present invention, the sounds relative to any desired pictures on the individual screens can be heard either selectively or simultaneously through the speaker(s) in the apparatus irrespectively of the parent screen or the child screen, whereby the known troublesome handling inclusive of the use of an earphone and swapping of the pictures on the parent and child screens can be eliminated at the time of hearing the desired sound(s).

The above and other features and advantages of the present invention will become apparent from the following description which will be given with reference to the illustrative accompanying drawings.

DESCRIPTION OF THE PREFERRED EMBODIMENTS

Hereinafter a first embodiment of the present invention will be described with reference to FIG. 1 through 4.

Figure 1:
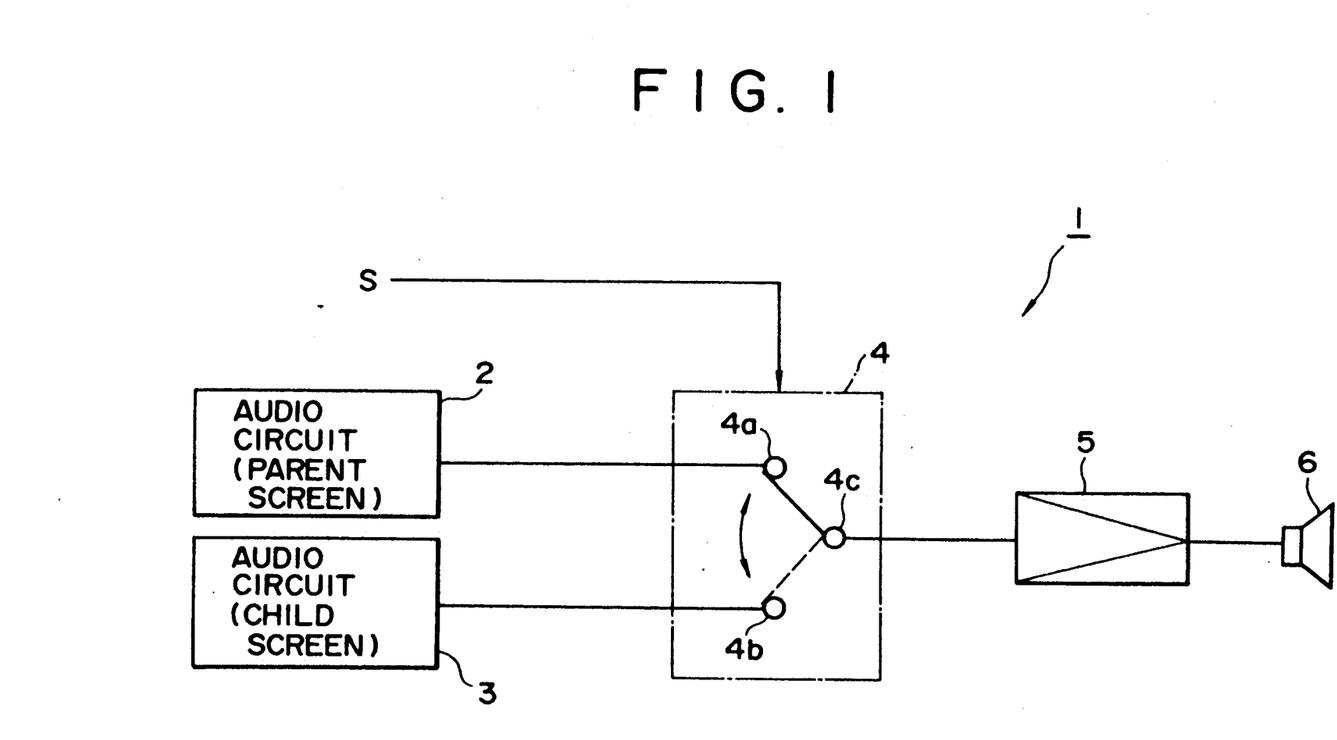
FIG. 1 is a block diagram showing a fundamental constitution of a first embodiment according to the present invention.

FIG. 1 is a block diagram showing a fundamental constitution 1 of an audio output circuit in an electronic apparatus equipped with a composite display function.

In the diagram, there are included an audio circuit 2 for outputting an audio signal relative to a picture on a parent screen, and another audio circuit 3 for outputting an audio signal relative to a picture on a child screen.

Denoted by 4 is a selective switching circuit wherein one input terminal 4a is connected to an output terminal of the audio circuit 2, and another input terminal 4b is connected to an output terminal of the audio circuit 3. For the purpose of simplifying the diagram, the audio signal is supposed here to be monaural, and merely a single signal transmission system is shown.

The selective switching circuit 4 is actuated under control by a switching control signal (hereinafter referred to as S) in such a manner that, when a microcomputer (not shown) receives a command signal from a depressed remote commander key for deciding which of the audio signals relative to the pictures on the parent and child screens is to be output, a switching control signal S corresponding to such command signal is transmitted from the microcomputer to the switching circuit 4 to thereby control the switching action.

Then the audio signal selected by the switching circuit 4 is fed from an output terminal 4c to an amplifier 5, and the amplified signal is output from a speaker 6.

Thus, the sound relative to the picture on the parent or child screen is selectively output under control of the switching circuit 4 executed in response to the signal S.

Figure 2:
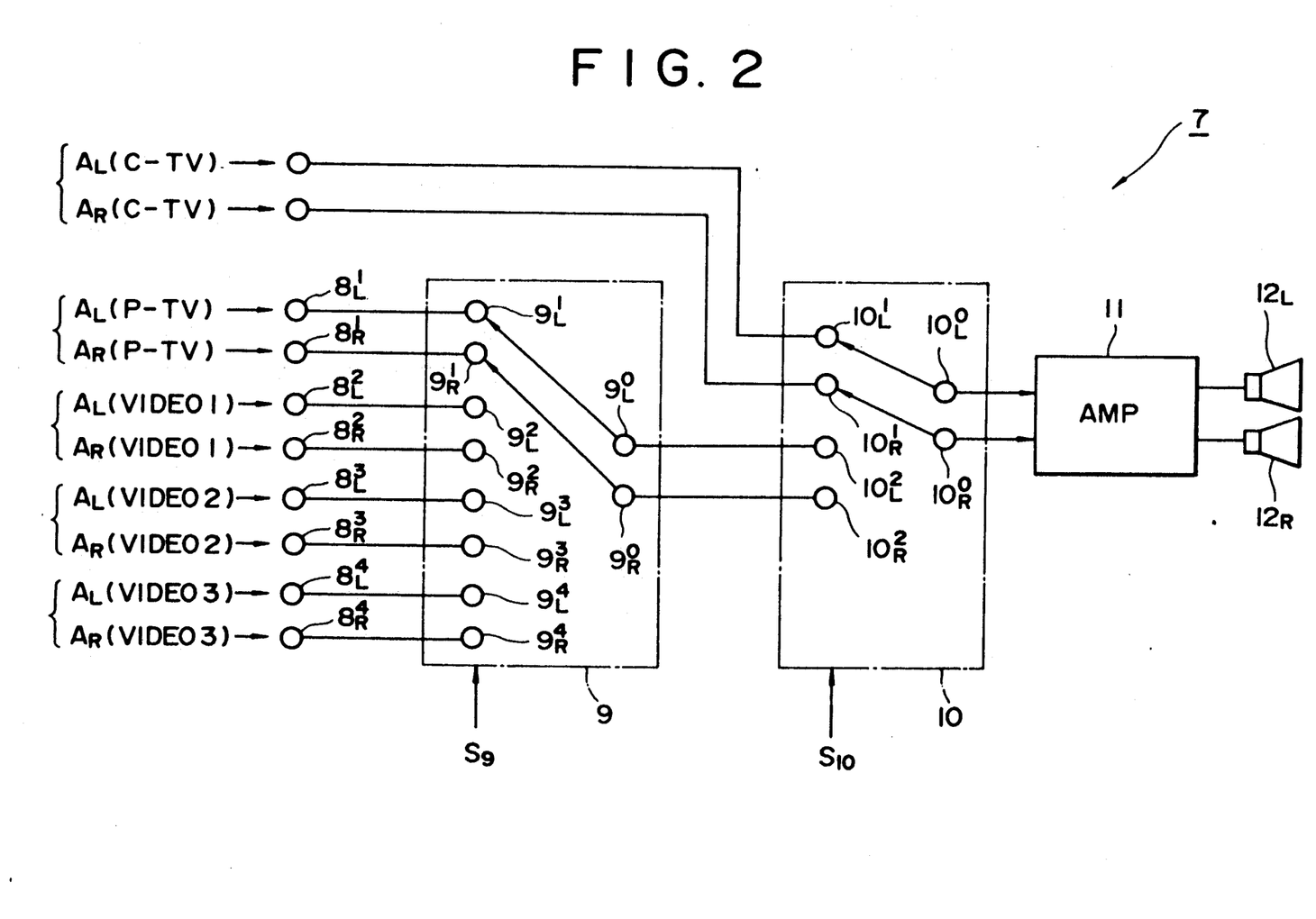
FIG. 2 is a circuit diagram of the first embodiment shown in FIG. 1.
Figure 3:
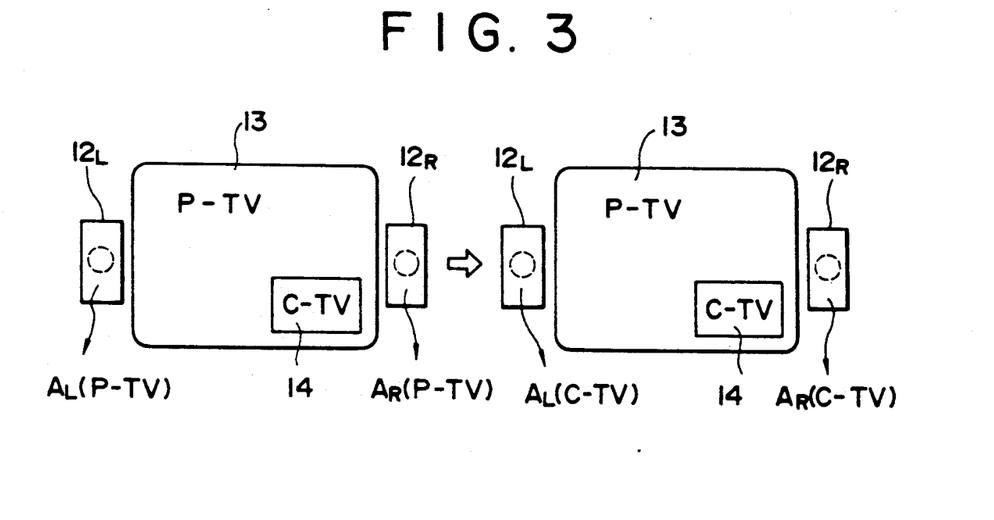
FIG. 3 illustrates an exemplary audio signal switching operation performed in the first embodiment.
Figure 4:
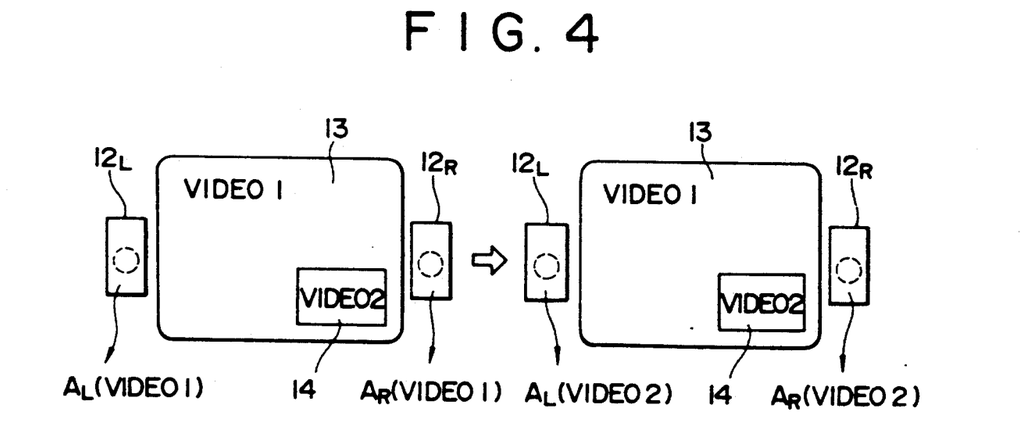
FIG. 4 illustrates another exemplary switching operation performed in the first embodiment.

FIGS. 2 through 4 show the specific constitution of the first embodiment 7 according to the present invention, wherein the sound relative to either of the pictures on the parent and child screens can be selectively output due to the additional provision of another selective switching circuit besides the existing audio switching circuit. In the following description, an audio signal is regarded as a stereophonic signal expressed with subscripts "L" and "R" which represent a left (L) channel and a right (R) channel respectively.

Denoted by $A_L(P-TV)$ and $A_R(P-TV)$ are television audio signals relative to a parent picture selected by a tuner (not shown). In this example, P-TV stands for a television signal of the parent picture, and C-TV for a television signal of the child picture.

Denoted by $A_L(VIDEOi)$ and $A_R(VIDEOi)$ (where i=1, 2, 3) are external input audio signals which, for example, are playback signals obtained from an external apparatus such as a video tape recorder, a laser disc player or the like. Denoted by VIDEOi (where i=1, 2, 3) is an external video signal.

There are also shown signal input terminals $8^j_L$ and $8^j_R$ (where j=1, 2, 3, 4). Signals $A_L(P-TV)$ and $A_R(P-TV)$ are fed to the input terminals $8^1_L$ and $8^1_R$ respectively; while signals $A_L(VIDEOi)$ and $A_R(VIDEOi)$ (where i=j−1) are fed respectively to the input terminals $8^j_L$ and $8^j_R$ (where j=2, 3, 4).

A selective switching circuit 9 has four pairs of input terminals $9^j_L$ and $9^j_R$ (where j=1, 2, 3, 4) which are connected respectively to the signal input terminals $8^j_L$ and $8^j_R$ (where j=1, 2, 3, 4) in such a manner that the values of the superscripts j in the mutually connected terminals become equal to each other.

The switching circuit 9 is selectively actuated under control by a switching control signal S9, so that the selected audio signals are fed from the output terminals $9^0_L$ and $9^0_R$ to a selective switching circuit 10 in the next stage.

The switching circuit 10 has two pairs of input terminals $10^k_L$ and $10^k_R$ (where k=1, 2), and television audio signals $A_L(C-TV)$ and $A_R(C-TV)$ relative to the child picture are inputted respectively to input terminals $10^1_L$ and $10^1_R$. Input terminals $10^2_L$ and $10^2_R$ are connected respectively to the output terminals $9^0_L$ and $9^0_R$ of the switching circuit 9 and are supplied with the audio signals selected by the switching circuit 9.

The switching circuit 10 is selectively actuated under control by a switching control signal S10, so that the selected audio signals are fed via output terminals $10^0_L$ and $10^0_R$ to an amplifier 11, and thereafter the amplified signals are output respectively from the speakers 12L and 12R.

The operation of the aforementioned audio output circuit 7 is performed in the following manner.

In case a television signal P-TV or an external input signal VIDEOi (where i=1, 2, 3) is selected as the video signal of the parent screen, if the audio signal relative to the picture on the parent screen is to be output, then a control signal S10 is supplied to the switching circuit 10 for connecting its contacts to the terminals $10^2_L$ and $10^2_R$, and the state of connection in the switching circuit 9 is changed by the control signal S9 to thereby select the desired audio signal.

Subsequently, if the audio signal relative to the picture on the child screen is to be output, the switching circuits 9 and 10 are selectively changed as follows.

For example, in case a television signal C-TV is selected as the video signal of the child screen, audio signals $A_L(C-TV)$ and $A_R(C-TV)$ are output respectively from the speakers 12L and 12R by connecting the contacts of the switching circuit 10 to the terminals $10^1_L$ and $10^1_R$.

FIG. 3 schematically illustrates an exemplary state where, in case the video signal of the parent screen 13 is P-TV and the video signal of the child screen 14 is C-TV, audio. signals $A_L(P-TV)$ and $A_R(P-TV)$ of the parent screen output first are switched to audio signals $A_L(C-TV)$ and $A_R(C-TV)$ of the child screen.

When the video signal of the child screen is an external input signal VIDEOi (where i=1, 2, 3), the contacts of the switching circuit 10 are selectively connected to the terminals $10^2_L$ and $10^2_R$, and the audio signal of the child screen is selected through the switching circuit 9 to be thereby output.

Suppose now that, as shown in FIG. 4, VIDEO1 is selected as the video signal of the parent screen 13 and VIDEO2 is selected as the video signal of the child screen 14.

If the audio signal relative to the picture on the parent screen is to be output in the above exemplary case, first the contacts of the switching circuit 10 are selectively connected to the terminals $10^2_L$ and $10^2R$, and the contacts of the switching circuit 9 are selectively connected to the terminals $9^2_L$ and $9^2R$. Then the audio signals $A_L(VIDEO1)$ and $A_R(VIDEO1)$ are output from the speakers 12L and 12R respectively via the amplifier 11.

Meanwhile, if the audio signal relative to the picture on the child screen is to be output, the contacts of the switching circuit 10 are left unchanged at the terminals $10^2L$ and $10^2R$, and the contacts of the switching circuit 9 are selectively connected to the terminals $9^3L$ and $9^3R$, whereby the audio signals $AI(VIDEO2)$ and $A_R(VIDEO2)$ are output from the speakers 12L and 12R respectively.

Thus, the video signal VIDEOi (where i=1, 2, 3) is selectable with respect to either of the parent screen and the child screen.

Table 1 given below lists combinations of video signals relative to the parent and child screens, and the states of selection of audio signals conforming thereto.

TABLE 1

| Video signal | | Stereo audio signal | | | |
| Parent screen | Child screen | When parent screen signal is outputted | | When child screen signal is outputted | |
| | | SW9 | SW10 | SW9 | SW10 |
| P-TV or VIDEO 1-3 | C-TV | One of 1-4 | 2 | — | 1 |
| P-TV | VIDEO1 | 1 | 2 | 2 | 2 |
| | VIDEO2 | 1 | 2 | 3 | 2 |
| | VIDEO3 | 1 | 2 | 4 | 2 |

TABLE 1-continued

| Video signal | | Stereo audio signal | | | |
| --- | --- | --- | --- | --- | --- |
| | | When parent screen signal is outputted | | When child screen signal is outputted | |
| Parent screen | Child screen | SW9 | SW10 | SW9 | SW10 |
| VIDEO1 | VIDEO2 | 2 | 2 | 3 | 2 |
| | VIDEO3 | 2 | 2 | 4 | 2 |
| VIDEO2 | VIDEO1 | 3 | 2 | 2 | 2 |
| | VIDEO3 | 3 | 2 | 4 | 2 |
| VIDEO3 | VIDEO1 | 4 | 2 | 2 | 2 |
| | VIDEO2 | 4 | 2 | 3 | 2 |

In Table 1, SW9 and SW10 represent the contact connection states of the switching circuits 9 and 10, respectively. And reference numerals indicating such connection states of SW9 and SW10 signify the values of superscripts in the input terminals $9^j$L(R) and $10^j$L(R) selected respectively in the switching circuits 9 and 10. Further in Table 1, the sign "—" indicates an indefinite state signifying that some one of the input terminals $9^j$L(R) is selected.

Figure 5:
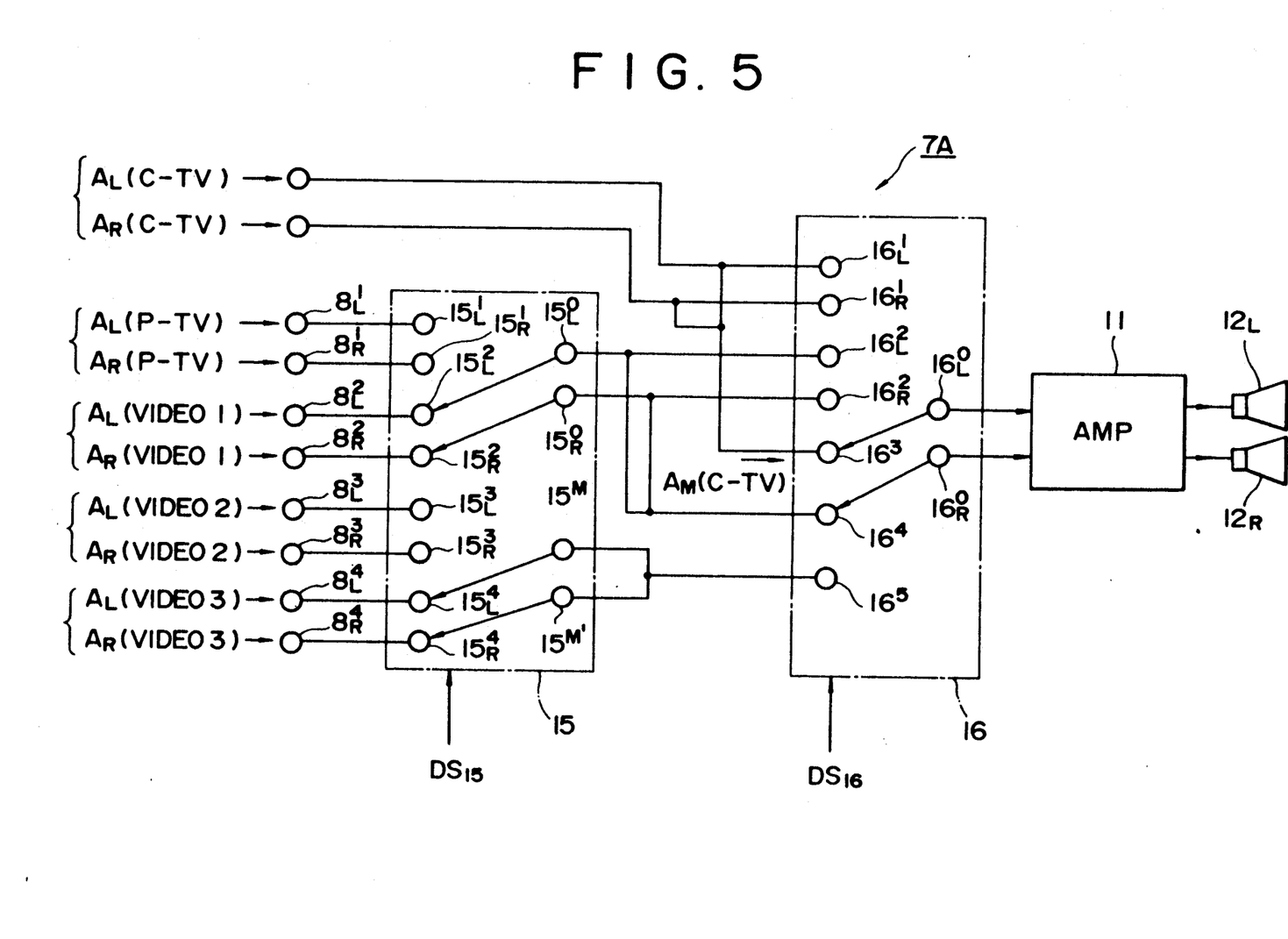
FIG. 5 is a circuit diagram of a second embodiment of an audio output circuit employed in an electronic apparatus equipped with a composite display function.
Figure 6:
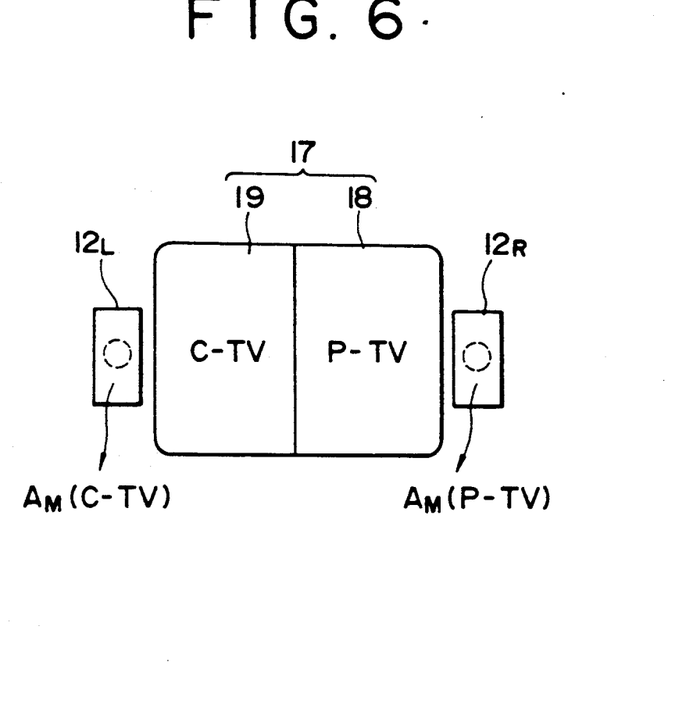
FIG. 6 illustrates an exemplary operation performed in the second embodiment.
Figure 7:
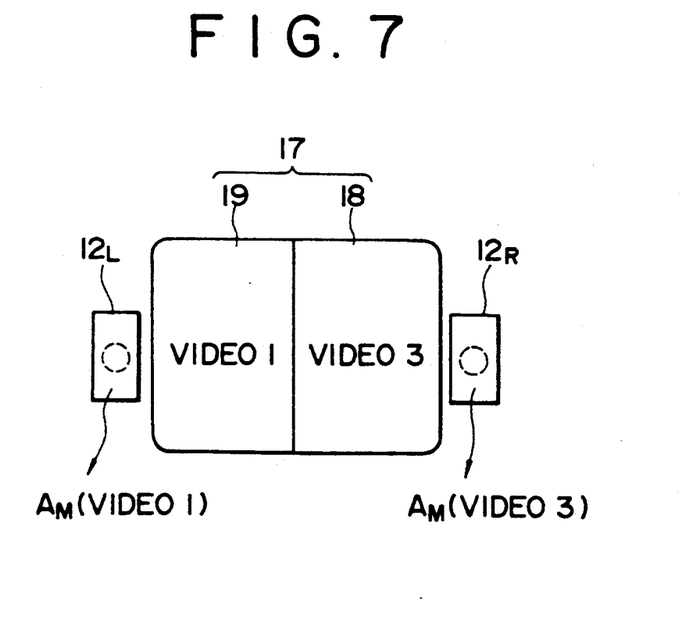
FIG. 7 illustrates another exemplary operation performed in the second embodiment.

FIGS. 5 through 7 show a second embodiment of the present invention so contrived that sounds relative to the pictures on both parent and child screens can be heard simultaneously as monaural audio signals.

In the second embodiment 7A, the same component elements as those employed in the aforementioned first embodiment 7 are denoted by the same reference numerals or symbols, and both video and audio signals in the following description are represented by the same reference symbols as those used in regard to the first embodiment 7.

In FIG. 5, a selective switching circuit 15 controlled by two-system switching control signals DS15 has four pairs of input terminals $15^j$L and $15^j$R (where j=1, 2, 3, 4) which are connected to signal input terminals $8^j$L and $8^j$R (where j=1, 2, 3, 4) in such a manner that the values of superscripts in the mutually connected terminals are equal to each other.

The switching circuit 15 further has four output terminals $15^0$L, $15^0$R, $15^M$, $15^{M'}$ of a four-contact structure. However, since the terminals $15^0$L and $15^0$R constitute one pair while the terminals $15^M$ and $15^{M'}$ constitute another pair, a two-contact structure is formed substantially.

Denoted by 16 is another selective switching circuit provided in a next stage and controlled by two-system switching control signals DS16. This circuit has seven input terminals.

Audio signals $A_L$(C-TV) and $A_R$(C-TV) are fed to the input terminals $16^1$L and $16^1$R respectively, and signals from the output terminals $15^0$L and $15^0$R of the switching circuit 15 are fed to the input terminals $16^2$L and $16^2$R.

A monaural audio signal $A_M$ (C-TV) obtained by mixing stereo audio signals $A_L$(C-TV) and $A_R$(C-TV) is fed to the input terminal $16^3$, while a monaural signal obtained by mixing stereo signals from the output terminal $15^0$L and $15^0$R of the switching circuit 15 is fed to the input terminal $16^4$. The input terminal $16^5$ is connected to the output terminals $15^M$ and $15^{M'}$ of the switching circuit 15 and is fed with a monaural signal.

Denoted by $16^0$L and $16^0$R are output terminals.

The switching circuit 16 has a two-contact structure and is so formed that the contact connection states thereof are controllable independently of each other by the switching control signals DS16. (In other words, the individual contacts are not always paired when switched.)

The audio signals from the output terminals $16^0$L and $16^0$R are supplied via an amplifier 11 to speakers 12L and 12R respectively.

Now the operation of the audio output circuit 7A in the second embodiment will be described below with reference to FIGS. 6 and 7.

The switching action for the stereo audio signals relative to both the parent and child screens is exactly the same as that executed in the aforementioned first embodiment 7, and therefore a repeated explanation is omitted here. Ignoring the output terminals $15^M$ and $15^{M'}$ in the switching circuit 15 and also the input terminals $16^3$, $16^4$ and $16^5$ in the switching circuit 16, the relationship of mutual correspondence among the terminals of FIGS. 5 and 2 is expressed as

| output terminals | $15^0$L → $9^0$L |
| --- | --- |
| | $15^0$R → $9^0$R |
| input terminals | $16^1$L → $10^1$L |
| | $16^1$R → $10^1$R |
| | $16^2$L → $10^2$L |
| | $16^2$R → $10^2$R |

It is thus obvious that the same result as that in Table 1 can be achieved.

Therefore the following description will be given principally with regard to the operation of simultaneously outputting, through the speakers 12L and 12R respectively, the monaural audio signals relative to pictures on both parent and child screens.

Such operation is performed in a case where the audio signal relative to the picture on the parent screen is output from one speaker 12R while the audio signal relative to the picture on the child screen is output from the other speaker 12L so that both audio signals are heard simultaneously. This status is effective in a split display mode where, as illustrated in FIGS. 6 and 7, the entire television screen is divided into two regions for displaying different pictures thereon.

For example, as illustrated in FIG. 6, a right half region 18 of the entire television screen 17 is used as a parent screen, while a left half region 19 thereof is used as a child screen. (Since the areas of both screen regions are equal to each other in this example, the distinction between parent and child is merely for the sake of convenience.) Assume now that the video signal relative to the parent screen is P-TV, and the video signal relative to the child screen is C-TV.

In this exemplary case, the selective switching circuit 15 is so changed that the input terminal $15^1$L is connected to the output terminal $15^M$, and the input terminal $15^1$R is connected to the output terminal $15^{M'}$. The state of connection between the input terminals and the output terminals $15^0$L, $15^0$R is indefinite and not concerned with the operation.

Meanwhile in another selective switching circuit 16, one output terminal $16^0$L is connected to the input terminal $16^3$, and the other output terminal $16^0$R is connected to the input terminal $16^5$.

As a result of such connection, the monaural signal $A_M$(P-TV) obtained by mixing the audio signals $A_L$(P-TV) and $A_R$(P-TV) is outputted from the right speaker 12R, while the monaural audio signal $A_M$(C-TV) is outputted from the left speaker 12L.

In another exemplary case where the video signal relative to the right half screen 16 is VIDEO3 and the video signal relative to the left half screen 19 is VIDEO1 as shown in FIG. 7, the input terminals $15^2L$ and $15^2R$ are connected respectively to the output terminals $15^0L$ and $15^0R$ in the switching circuit 15, and the input terminals $15^4L$ and $15^4R$ are connected respectively to the output terminals $15^M$ and $15^{M'}$. Meanwhile in another switching circuit 16, the input terminal $16^4$ is connected to the output terminal $16^0L$, and the input terminal $16^5$ is connected to the output terminal $16^0R$.

Due to such connection, the monaural audio signal $A_M$(VIDEO3) relative to the video signal VIDEO3 is output from the right speaker 12R, while the monaural audio signal $A_M$(VIDEO1) relative to the video signal VIDEO1 is output from the left speaker 12L.

The combinations of signals mentioned above are listed in Table 2 below.

TABLE 2

| Video signal | | Monaural audio signal | | | |
| --- | --- | --- | --- | --- | --- |
| | | When parent (right) signal is outputted | | When child (left) signal is outputted | |
| Parent (right) screen | Child (left) screen | SW15 $S_M$ | SW16 $S_R$ | SW15 $S_{LR}$ | SW16 $S_L$ |
| P-TV or VIDEO 1-3 | C-TV | One of 1-4 | 5 | — | 3 |
| P-TV | VIDEO1 | 1 | 5 | 2 | 4 |
| | VIDEO2 | 1 | 5 | 3 | 4 |
| | VIDEO3 | 1 | 5 | 4 | 4 |
| VIDEO1 | VIDEO2 | 2 | 5 | 3 | 4 |
| | VIDEO3 | 2 | 5 | 4 | 4 |
| VIDEO2 | VIDEO1 | 3 | 5 | 2 | 4 |
| | VIDEO3 | 3 | 5 | 4 | 4 |
| VIDEO3 | VIDEO1 | 4 | 5 | 2 | 4 |
| | VIDEO2 | 4 | 5 | 3 | 4 |

In Table 2: the sign "—" indicates an indefinite state as described already; SW15 represents the contact connection state of the switching circuit 15; $S_M$ signifies the connection state between the output terminals $15^M$, $15^{M'}$ and the input terminals; and $S_{LR}$ signifies the connection state between the output terminals $15^0L$, $15^0R$ and the input terminals. Further, SW16 represents the contact connection state of the switching circuit 16; $S_R$ signifies the connection state between the output terminal $16^0R$ and the input terminal; and $S_L$ signifies the connection state between the output terminal $16^0L$ and the input terminal. As in Table 1, the numerals in Table 2 denote the values of superscripts i, j, k in the input terminals $15^iL(R)$ (where i=1, 2, 3, 4), $16^jL(R)$ (where j=1, 2) and $16^k$ (where k=3, 4, 5) selected respectively in the switching circuits 15 and 16.

It is obvious from Table 2 that a line of $15^M$, $15^{M'} \rightarrow 16^5 \rightarrow 16^0R$ is a path of the monaural audio signal relative to the parent (right) screen, and a line of $15^0L$, $15^0R \rightarrow 16^4 \rightarrow 16^0L$ is a path of the monaural audio signal relative to the child (left) screen with the exception of C-TV.

When the outputs of the two speakers 12L and 12R have the same sound volume and there exists some difficulty in simultaneously hearing them, another function of varying the sound balance may be additionally provided.

As described hereinabove, with regard to an audio output circuit in an electronic apparatus equipped with a composite display function for displaying a plurality of pictures on composite screen regions of a single display screen, the invention defined in the appended claim 1 includes an audio signal switching means which is capable of selectively switching audio signals relative to the pictures on the individual screen regions and outputting the selected audio signal to a speaker. And the invention defined in the appended claim 2 includes a simultaneous audio output means which is capable of selecting a plurality of audio signals out of those relative to the pictures on the individual screen regions, and outputting the selected audio signals simultaneously through a plurality of speakers.

Thus, according to the present invention, any audio signal(s) relative to the picture(s) displayed on the individual screen region(s) can be heard either selectively or simultaneously through the speaker(s) irrespectively of the parent or child screen, so that the troublesome handling in the conventional apparatus can be eliminated in hearing any desired sound.

What is claimed is:

1. An audio output circuit in an electronic apparatus equipped with two loudspeakers and a composite display function for displaying a plurality of pictures on composite screen regions of a single display screen, said circuit comprising:

simultaneous audio output means for selecting two audio signals corresponding to two of said plurality of pictures displayed on said composite screen regions, and outputting the selected two audio signals simultaneously to said two loudspeakers.

* * * * *